United States Patent
Pegram et al.

(10) Patent No.: US 6,977,051 B2
(45) Date of Patent: *Dec. 20, 2005

(54) METHOD AND APPARATUS FOR CONTACT LENS MOLD ASSEMBLY

(75) Inventors: Stephen Pegram, Jacksonville, FL (US); Kent Young, Jacksonville, FL (US); Kerry Sanders, Jacksonville, FL (US); Jeffrey Steven, Jacksonville, FL (US)

(73) Assignee: Jonhson & Johnson, Jacksonville, FL (US)

( * ) Notice: Subject to any disclaimer, the term of this patent is extended or adjusted under 35 U.S.C. 154(b) by 235 days.

This patent is subject to a terminal disclaimer.

(21) Appl. No.: 10/215,775

(22) Filed: Aug. 9, 2002

(65) Prior Publication Data

US 2003/0038388 A1    Feb. 27, 2003

Related U.S. Application Data

(63) Continuation-in-part of application No. 09/925,111, filed on Aug. 9, 2001, now abandoned.

(51) Int. Cl.⁷ ............................................. B29D 11/00
(52) U.S. Cl. ................. 264/1.1; 264/2.5; 264/DIG. 78; 425/346; 425/450.1; 425/808; 425/DIG. 60
(58) Field of Search ................... 264/2.5, 1.1, DIG. 78; 425/450.1, 808, 346, DIG. 60

(56) References Cited

U.S. PATENT DOCUMENTS

| | | |
|---|---|---|
| 3,896,688 A | 7/1975 | Wrue |
| 4,402,659 A | 9/1983 | Greenbaum |
| 4,407,766 A | 10/1983 | Haardt et al. |
| 4,422,984 A | 12/1983 | Neefe |
| 4,495,313 A | 1/1985 | Larsen |
| 4,565,348 A | 1/1986 | Larsen |
| 4,640,489 A | 2/1987 | Larsen |
| 4,680,336 A | 7/1987 | Larsen et al. |
| 4,691,820 A | 9/1987 | Martinez |
| 4,786,444 A * | 11/1988 | Hwang ..................... 264/1.38 |
| 4,889,664 A | 12/1989 | Kindt-Larsen et al. |
| 5,039,459 A | 8/1991 | Kindt-Larsen et al. |
| 5,080,839 A | 1/1992 | Kindt-Larsen |
| 5,094,609 A | 3/1992 | Kindt-Larsen |
| 5,114,629 A | 5/1992 | Morland et al. |
| 5,173,100 A | 12/1992 | Shigyo et al. |
| 5,192,352 A | 3/1993 | Kuwabara et al. |
| 5,264,160 A | 11/1993 | Arai et al. |
| 5,266,077 A | 11/1993 | Auten et al. |

(Continued)

FOREIGN PATENT DOCUMENTS

EP           406161           2/1995

(Continued)

OTHER PUBLICATIONS

PCT International Search Report, dated Oct. 16, 2002, for PCT Int'l. Appln. No. PCT/US02/25536.

*Primary Examiner*—Chris Fiorilla
*Assistant Examiner*—Yewebdar Tadesse

(57) ABSTRACT

This invention provides an apparatus and method for assembling first and second mold parts having contact lens forming surfaces, wherein said first mold part has a reaction mixture on said contact lens forming surface, said apparatus comprising movement preventing means which prevents said first mold part from moving while said second mold part is controllably moved from a first position wherein said second mold part is not in contact with said reaction mixture on said first mold part to a position wherein the majority of said contact lens forming surface of said second mold part has been wetted by said reaction mixture on said first mold part.

11 Claims, 7 Drawing Sheets

U.S. PATENT DOCUMENTS

| | | |
|---|---|---|
| 5,542,978 A | 8/1996 | Kindt-Larsen et al. |
| 5,555,504 A | 9/1996 | Lepper et al. |
| 5,597,519 A | 1/1997 | Martin et al. |
| 5,620,635 A * | 4/1997 | DeRozier et al. ............ 264/2.5 |
| 5,648,024 A | 7/1997 | Galas |
| 5,658,602 A * | 8/1997 | Martin et al. ............... 425/346 |
| 5,710,302 A | 1/1998 | Kunzler et al. |
| 5,744,357 A | 4/1998 | Wang et al. |
| 5,753,150 A | 5/1998 | Martin et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,804,107 A | 9/1998 | Martin et al. |
| 5,844,802 A | 12/1998 | Lepper et al. |
| 5,849,811 A | 12/1998 | Nicolson et al. |
| 5,850,107 A | 12/1998 | Kindt-Larsen et al. |
| 5,916,494 A | 6/1999 | Widman et al. |
| 5,922,249 A | 7/1999 | Ajello et al. |
| 5,965,172 A | 10/1999 | Wang et al. |
| 5,965,631 A | 10/1999 | Nicolson et al. |
| 5,981,615 A | 11/1999 | Meijs et al. |
| 5,998,498 A | 12/1999 | Vanderlaan et al. |
| 6,015,512 A | 1/2000 | Yang et al. |
| 6,039,899 A | 3/2000 | Martin et al. |
| 6,071,440 A | 6/2000 | Wang et al. |
| 6,087,415 A | 7/2000 | Vanderlaan et al. |
| 6,113,817 A | 9/2000 | Herbrechtsmeier et al. |
| 6,241,918 B1 | 6/2001 | Calvin et al. |
| 6,257,547 B1 | 7/2001 | Togo et al. |

FOREIGN PATENT DOCUMENTS

| | | |
|---|---|---|
| EP | 1 020 283 A2 | 7/2000 |
| GB | 2 191 144 A | 12/1987 |
| JP | 2000016905 | 1/2000 |
| WO | WO 94/21698 | 9/1994 |
| WO | WO 96/24074 | 8/1996 |

* cited by examiner

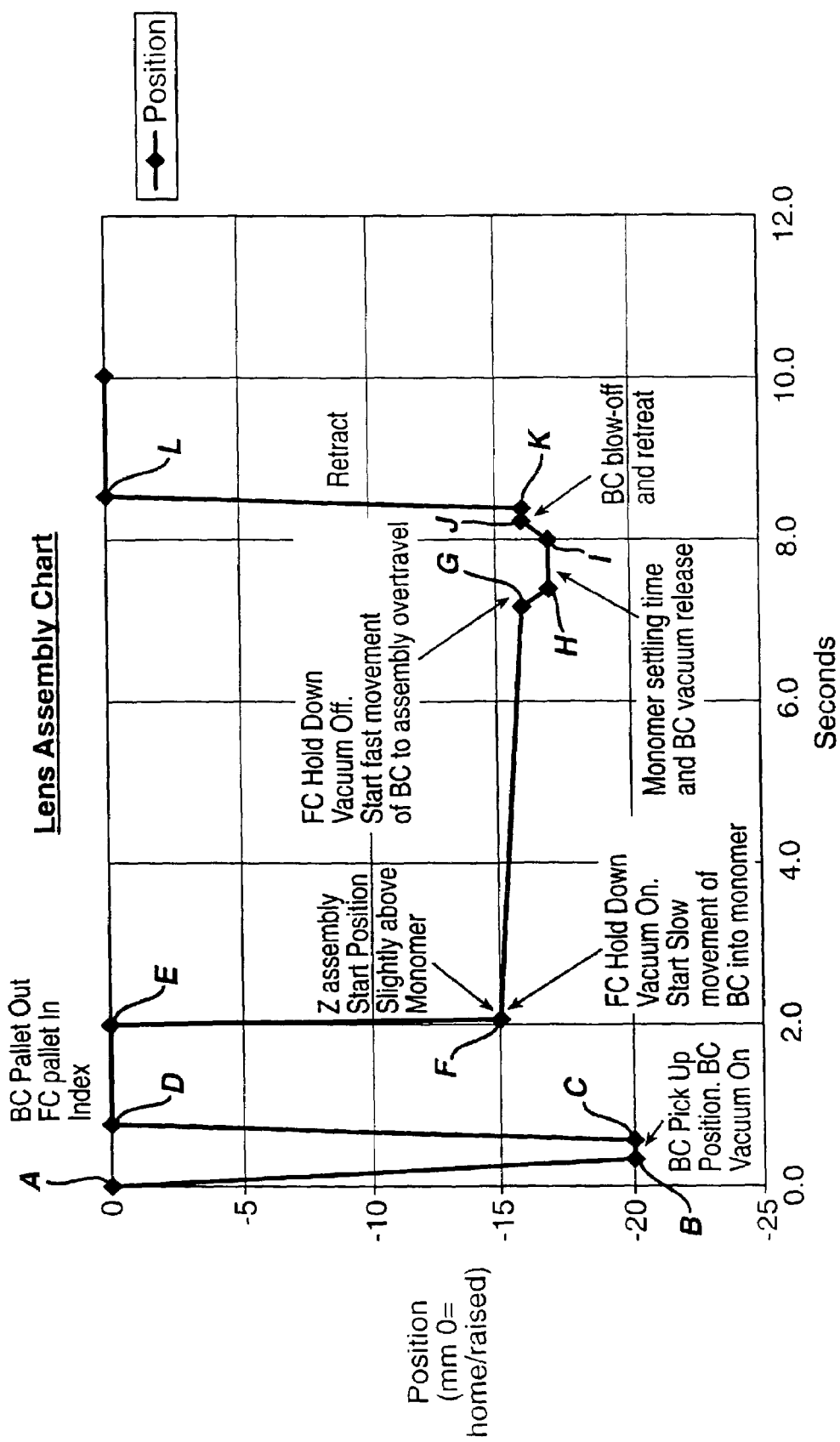

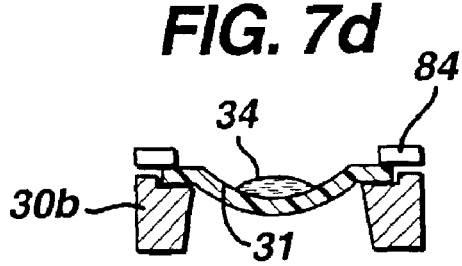
FIG. 7d
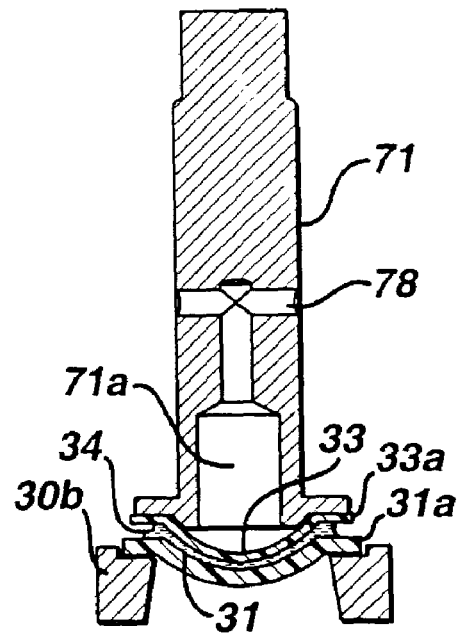
FIG. 7e
| HOLD FRONT CURVE MOLD HALF STATIONARY | → | ASSEMBLY OF FRONT AND BACK CURVE MOLD HALVES |
FIG. 7f

US 6,977,051 B2

METHOD AND APPARATUS FOR CONTACT LENS MOLD ASSEMBLY

This application is a continuation-in-part of Pegram et al, U.S. Ser. No. 09/925,111 filed Aug. 9, 2001, now abandoned having the same title, which is fully incorporated herein by reference.

FIELD OF THE INVENTION

The present invention relates generally to an apparatus and method for assembling molds used in the production of contact lenses, and more particularly, for assembling a mold having a reaction mixture therein to form a contact lens.

BACKGROUND OF THE INVENTION

U.S. Pat. No. 4,564,348 to Larsen, assigned to the assignee of the present invention, discloses plastic molds for manufacturing a plurality of soft contact lenses in a continuous or semicontinuous method of operation. A mold assembly having a plurality of mold units is filled with a polymerization mixture in a first dosing step, and the mold units are then covered with a convex mold member or lid as shown in FIG. 5, and the lids are brought to rest on the concave mold members properly aligned and without distortion. The lids are free to float and align themselves on the pool of polymerizable mixture held in the concave mold.

U.S. Pat. No. 4,640,489, also to Larsen, now assigned to the assignee of the present application, discloses a mold for making contact lenses wherein one of the two mold sections is relatively more flexible than the other. In addition, a number of mold constructions known to the prior art are discussed in the background portion of the specification of this patent.

U.S. Pat. No. 4,495,313, also to Larsen, and now assigned to the assignee of the present application, discloses a mold assembly in which shrinkage of the monomer mixture during polymerization creates a negative pressure which aligns the upper mold half and draws excess monomer into the cavity.

In the commercial application of the invention described in U.S. Pat. No. 4,640,489 it has been found advantageous to weight the upper male portion of the mold cavity with a fixed weight subsequent to assembly to seat the upper male mold half and to displace any excess monomer in the mold cavity into a space between the flanges, as illustrated in FIG. 1 of that patent, to form a HEMA ring which is preferentially adhered to the upper or male portion of the mold cavity by a corona discharge treatment of a portion of the male mold.

U.S. Pat. No. 5,658,602 discloses a method and apparatus for contact lens mold filling and assembly in which dosing and the assembly of the mold parts in the method takes place in a vacuum environment. Although the use of the vacuum allowed for faster assembly of the mold parts, the vacuum complicated the apparatus and the process and often required service to keep the apparatus and process functioning as intended. However, efforts to assemble the mold parts without a vacuum lead to increased numbers of defects in the contact lenses produced. The majority of defects appeared to be bubbles of air trapped in the reaction mixture.

There is a need for a method and apparatus for assembly of contact lens molds that will eliminate the need for a vacuum environment, yet provide contact lenses without defects.

SUMMARY OF THE INVENTION

The present invention is an apparatus and a method for assembling contact lens molds with a reaction mixture to form a contact lens which does not require the use of a vacuum environment during the assembly step (and the dosing step), yet still insures that air and/or other gases are not trapped in the mold cavity with the reaction mixture. It was discovered that if the apparatus and method provide that a first mold part remains stationary while the second mold part is moved onto or into the first mold part that air or other gases are not trapped in the mold cavity with the reaction mixture. Further, beneficial rates for the assembly of the mold parts were determined. These rates when used in any assembly apparatus decrease the formation of defects in the contact lenses.

This invention provides a method and an apparatus for assembling a mold assembly, said mold assembly comprising first and second mold parts having contact lens forming surfaces, wherein said first mold part has a reaction mixture on said contact lens forming surface, said apparatus comprising movement preventing means which prevents said first mold part from moving while said second mold part is controllably moved from a first position wherein said mold part is not in contact with said reaction mixture on said first mold part to a position wherein said contact lens forming surface of said second mold part has been substantially wetted by said reaction mixture on said first mold part.

It was determined that during the assembly of mold parts without the movement preventing means the second mold part would when it contacted the reaction mixture within the first mold part, via a wicking action of the reaction mixture, uncontrollably lift and move the first mold part toward the second mold part leading to an uncontrolled assembly of the mold parts and the trapping of air in the reaction mixture.

BRIEF DESCRIPTION OF THE DRAWINGS

The foregoing objects and advantages of the present invention may be more readily understood by one skilled in the art with reference to the following detailed description of the preferred embodiments, taken in conjunction with the accompanying drawings wherein like elements are designated by identical reference numerals throughout the several views.

FIG. 6 is a diagrammatic time line illustration of the assembly steps of one embodiment of the present invention.

FIGS. 7(d)–7(e) is a diagrammatic and illustrated flow diagram of an alternative embodiment of the method of the present invention.

FIG. 7(f) is a block diagram flow chart of an alternative embodiment of the method of the present invention.

DETAILED DESCRIPTION OF THE PREFERRED EMBODIMENT

Figure 1:
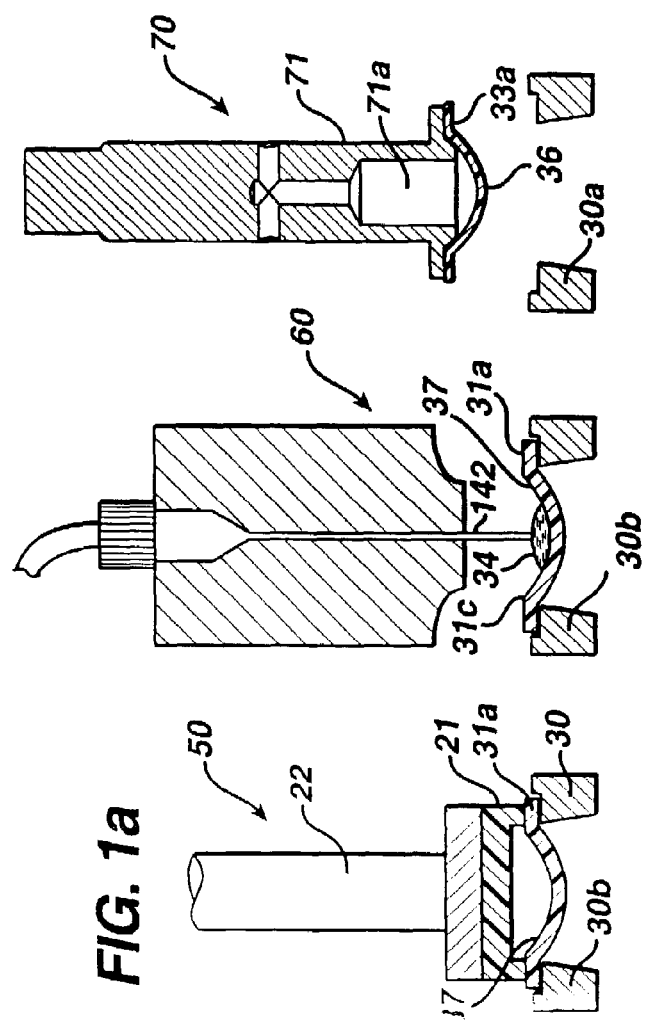
FIGS. 1(a)–1(e) is a diagrammatic and illustrated flow diagram of an embodiment of the method of the present invention.
FIG. 1(f) is a block diagram flow chart of an embodiment of the method of the present invention.

U.S. Pat. No. 5,658,602 as discussed above describes an apparatus and method of dosing and assembling mold parts, and is fully incorporated herein by reference.

The present invention is useful in a process for forming contact lenses from a reaction mixture. The contact lenses are preferably formed in a mold assembly having first and second mold parts, which have been previously disclosed in the prior art, but will described in relation to FIG. 2. In an exemplary embodiment illustrated in FIG. 2, the mold assembly 35 comprises first mold part 37, and second mold part 36, both of which are preferably formed of polystyrene transparent to visible and ultraviolet light. However, other materials such as other plastic materials, metal, glass and quartz may be used in this invention, many of which are disclosed in the prior art. First mold part 37 comprises a central curved section defining a concave surface 31, circular circumferential edge 31c, and integral with said edge an essentially uniplanar flange 31a that is extended on one side to form a tab 31d. The second mold part 36 comprises convex surface 33, flange 33a, and tab 33d. When assembled the mold assembly defines a cavity 32 in which a reaction mixture 34 forms a contact lens. Typically, excess reaction mixture 34a overflows cavity 32, and collects on the flange 31a. At least a part of the concave surface 31 and the convex surface 33 are contact lens forming surfaces, that is, they are surfaces that have the dimensions of the front surface and back surface of the contact lens to be formed in the mold assembly 35. As shown, all of the concave surface 31 is a contact lens forming surface; however, for a different first mold part and/or mold assembly that may not be true. In the preferred embodiment, the first mold part is and may be referred to herein as a front curve mold, or variations of that, such as front curve, front curve mold half, FC or the like, and the second mold part 36 is and may be referred to herein as a back curve mold or variations of that, such as back curve, back curve mold half, BC or the like. The back curve mold half forms the back surface of a contact lens, that is, the surface that contacts the eye when worn, the front curve mold half forms the opposite surface.

Figure 2:
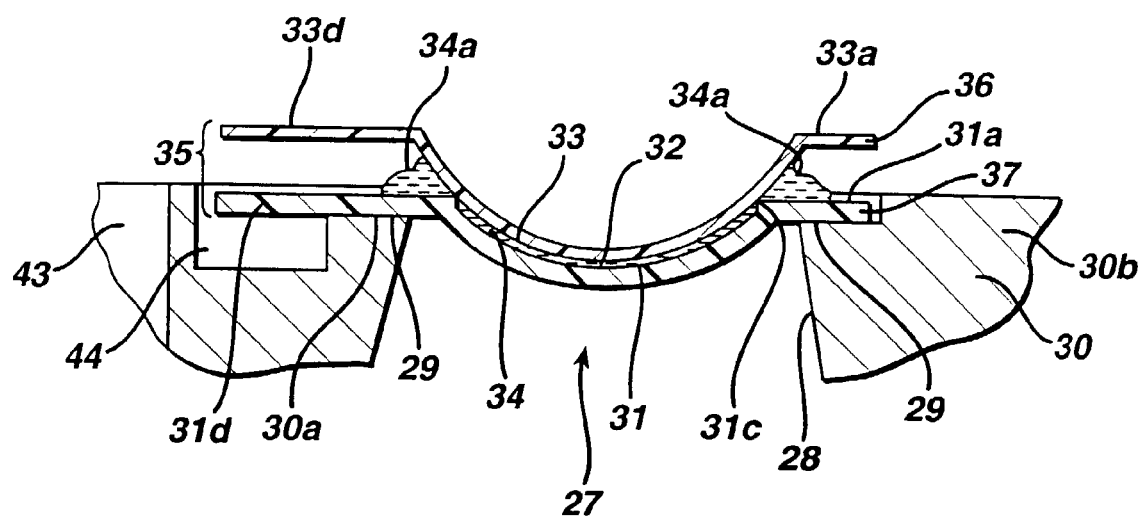
FIG. 2 is a cross-section view of an assembled mold showing a partial cross-section of a carrier that is used in the preferred embodiment of the invention.

In the preferred embodiment, which is not shown in FIG. 2, the mold parts have approximately the same thickness and preferably weigh less than 1 gram each. Also in the preferred embodiment the mold parts are disposable. However, this invention can be used to decrease the numbers of defects formed in the surfaces of contact lenses using mold parts having various designs or comprising various materials that are reusable or disposable or mold parts that otherwise differ from the mold parts described herein. The preferred mold parts are disclosed and described in U.S. patent application Ser. No. 09/305,889 titled Mold, Molding System and Molding Machine for Making Ophthalmic Devices (VTN-424), incorporated herein by reference.

Figure 5:
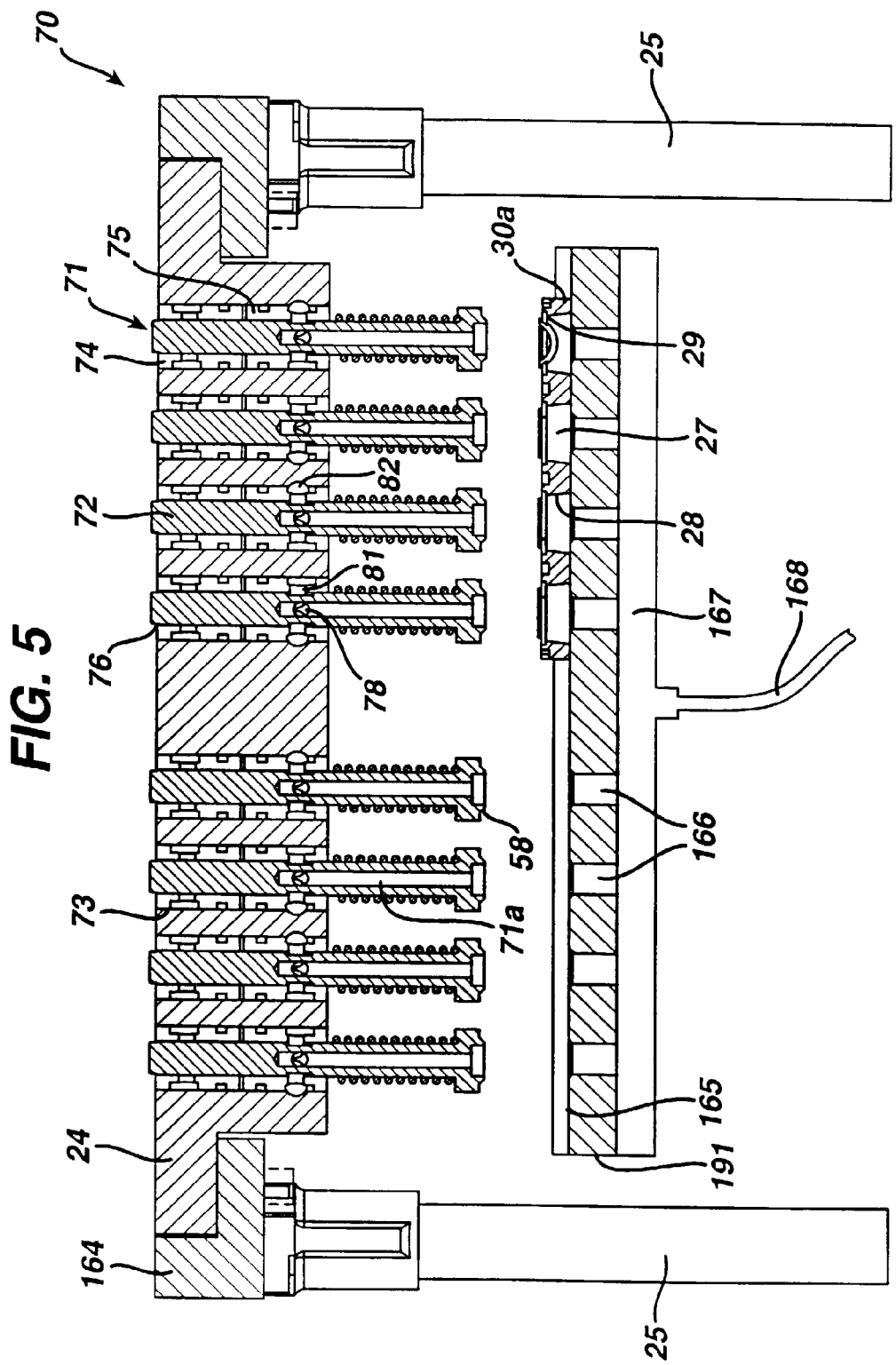
FIG. 5 is a partially cross-sectioned side view of the assembly module illustrated in FIG. 4, along line 5—5 shown in FIG. 4.

As shown in partial cross-section in FIG. 2, the mold assembly 35 and the mold parts prior to assembly are preferably carried in a carrier or pallet 30. (The preferred carrier 30 is also shown in FIGS. 5 and 6.) The carrier 30 preferably has multiple holes 27 defined by angled sides 28 through the total thickness of the carrier 30, and supporting ledges 29 around the holes 27. As shown in FIG. 2, the supporting ledge 29 has a shape that is preferably similar to the outline of the mold part 37 for receipt of the flange 31a, and allows for the receipt of the tab 31d and therefore the first mold part 37 in a single orientation. Additional holes 43 through the pallet are provided for registration or sensoring, and shallow gullies 44 may be provided in the pallet to provide space for material vestiges from injection molding gate for injection molded parts, if needed. Carriers 30 may also comprise a bar code or memory chip (not shown) for tracking purposes.

The carriers may carry one or multiple mold parts and/or mold assemblies. The carrier may also be of any design, not necessarily a flat pallet. Alternatively, this invention contemplates that the mold parts and mold assemblies may be self-supporting and conveyed from step to step without having to be mounted on a carrier. For example, if the first mold part was formed with legs or a structure similar to contact lens packages. In the preferred embodiment, prior to mold assembly, each carrier carries only one type of mold part. Herein, prior to assembly, the carrier or pallet carrying front curves will be labeled 30b and the pallet carrying back curves will be labeled 30a. Reference to "pallet 30b"; therefore, refers to the pallet carrying front curves, and reference to "pallet 30a"; therefore refers to the pallet carrying back curves.

The reaction mixture preferably comprises a monomer mixture that forms a hydrogel, or silicone hydrogel upon polymerization. Alternatively, the reaction mixture may be one that has been partially polymerized prior to deposition into the mold, and is then cross-linked in the mold to form a contact lens. Preferably, the contact lens formed using this invention is a soft contact lens; however, this invention can be used to form hard contact lenses. Examples of reaction mixtures useful in this invention are disclosed in U.S. Pat. Nos. 4,495,313; 4,680,336; 5,039,459; 5,776, 999; 5,789, 461; 5,760,100; 5,965,631; 5,849,811; 6,087,415; 5,998, 498; 4,889,664 and 5,710,302; WO 9421698, EP 406161, JP 2000016905, and WO 96/24074. These patents as well as all other patents disclosed in this application are hereby incorporated by reference in their entirety. Additionally, the reaction mixture is preferably degassed prior to deposition in the mold part as disclosed in the prior art.

After assembly of the mold having the reaction mixture therein, the mold assembly may be further treated to cure, polymerize, cross-link, hydrate, clean and/or otherwise modify the reaction mixture to form the contact lens. Preferably for the polymerization hydrogel, the mold assembly is clamped together in a precure step wherein the polymerization mixture is exposed to actinic light, and heat. At the completion of the precure step, the polymerization mixture has formed a partially polymerized gel, and then the mold assembly is subjected to additional light and heat in a cure step. The pre-cure and cure have been disclosed in the prior art, e.g. in U.S. Pat. Nos. 5,597,519; and 5,753,150, incorporated herein by reference. Additional or alternative steps for the complete formation of contact lenses have been disclosed in the prior art, including the patents listed above, or are known to persons of ordinary skill in the art.

FIG. 1(f) is a block diagram of the method of the present invention and FIGS. 1(a)–(e) are diagrammatic illustrations of one embodiment of the method of the present invention. As illustrated in FIG. 1(a), carriers or pallets 30 are fed to the deposition and/or assembly stations carrying first mold parts 37 and second mold parts 36. The pallets may arrive in alternating sequence with the pallet containing back curves first in sequence, followed immediately thereafter by a pallet loaded with front curves, or in the preferred embodiment, there can be adjacent lanes or tracks, one lane for pallets having back curves and the other lane for pallets having front curves. Lanes are shown and described in reference to FIG. 4. The lanes preferably comprise a smooth metal surface on which the pallets are pushed or pulled to convey the pallets from one station or apparatus to the next. In the preferred embodiment mold parts are injection molded, conveyed to the stamping, deposition and assembly stations, and fully assembled in less than 70 seconds, in an ambient environment as described in U.S. Ser. No. 09/222,266, filed Dec. 28, 1998, now U.S. Pat. No. 6,241,918 (VTN-421), titled "Process Of Manufacturing Contact Lenses In Ambient Environment" incorporated herein by reference.

In the preferred embodiment, the first station in the method for assembling the mold parts is an optional stamping station schematically illustrated in FIG. 1(a), and more fully described in U.S. Ser. No. 08/258,263, filed Jun. 10, 1994, and, entitled Method and Apparatus For Applying a Surfactant to Mold Surfaces, assigned to the assignee of the present invention, and in U.S. Pat. No. 5,658,602, both of which are incorporated herein by reference,. As illustrated in FIG. 1(a), the flange 31a of the first mold part 37 is stamped via stamp pad 21 with a thin film of surfactant which has been found useful in removing the excess reaction mixture displaced from the cavity 32. The excess reaction mixture 34a was described above in reference to FIG. 3. At the time of the mold assembly, shown in FIG. 1(e), the excess reaction mixture is displaced in an annular ring between the flanges 31a and 33a. The excess reaction mixture 34 may be cured or cross-linked contemporaneously with the reaction mixture that forms the contact lens, or it may be removed after the assembly step shown in FIG. 1(e) prior to any additional processing steps.

As has been disclosed in the prior art, by stamping the front curve mold flange 31a with a mold release surfactant, the excess reaction mixture 34 preferentially adheres to the back curve mold half flange 33a and is removed from the production line at the time the back curve mold half is removed at mold disassembly after curing. In the preferred embodiment, the mold release surfactant is a polyethylene oxide sorbitan mono-oleate, commercially sold under the trade name "Tween 80".

The stamping head station 50 includes mounted therein a plurality of stamps 21 each adapted to be moved in vertical reciprocatory movement in a coordinated matter by pistons 22 mounted in the stamping head station 50, wherein the number of stamps 21 is correlated with the number of front curves 37 carried by mold pallet 30.

Again the step of stamping the flange with a release surfactant is an optional one. It can be eliminated by substituting a flange washing step prior to any demolding step during which at least one mold part is removed to expose the contact lens formed within the mold assembly. Alternatively, the flange may be formed such that it entraps the overflow reaction mixture, or otherwise removes it from the flange via a drain provided in the flange, or the flange may be treated in an alternative manner to provide preferential adhesion of the overflow reaction mixture to one mold part, e.g. by corona discharge treatment.

Figure 3:
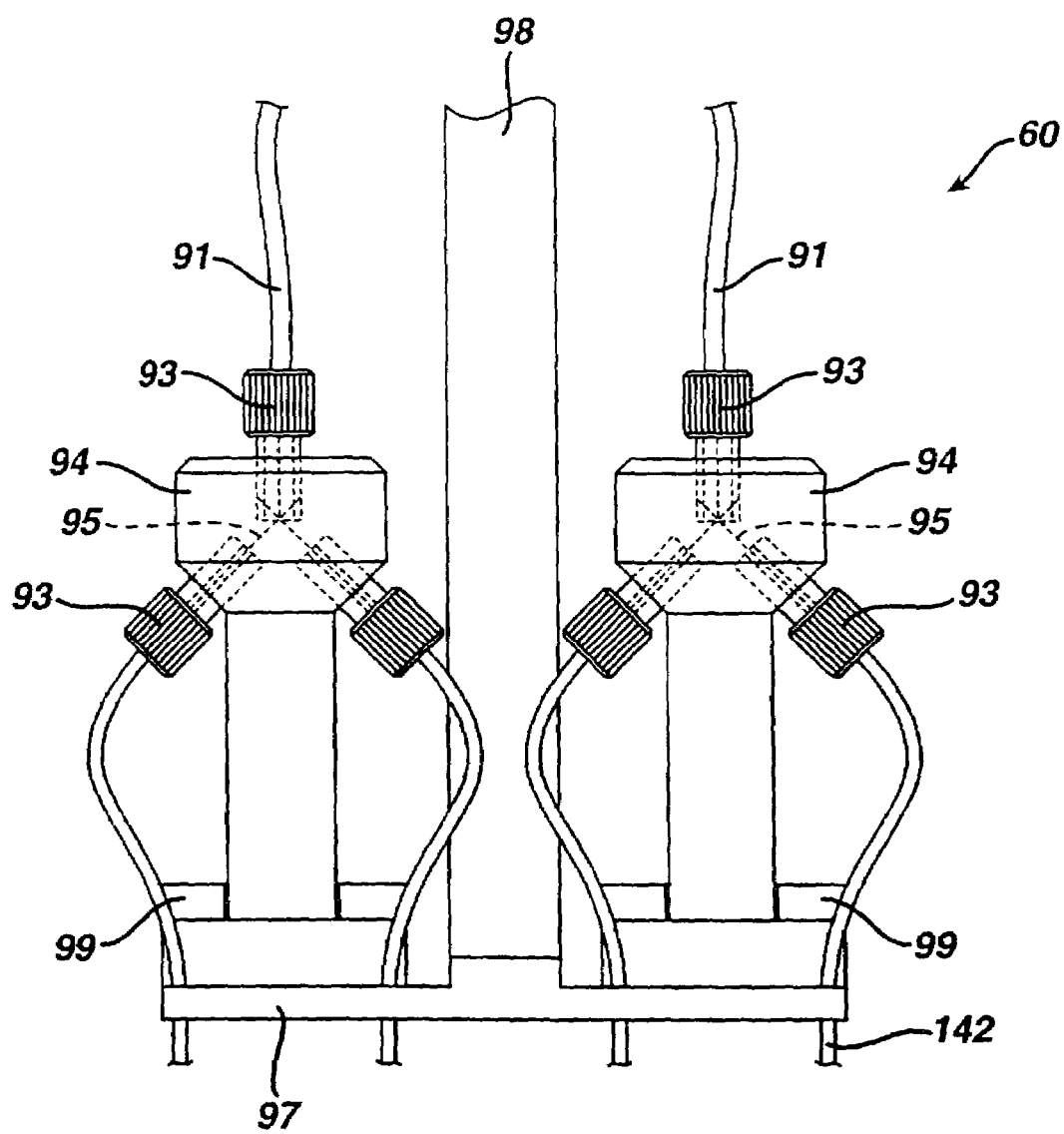
FIG. 3 is a diagrammatic side view of the filling station used for depositing a predetermined amount of reaction mixture in each of the first mold parts.

After stamping the front curves, pallets 30b are conveyed to the deposition station as illustrated in FIG. 1(b), alternatively pallets 30a and 30b can be moved into or through the deposition station. In the preferred embodiment reaction mixture is deposited only in the front curve, so pallet 30b is located beneath the deposition station 60, while pallet 30a is located in an adjacent lane. A predetermined amount of the reaction mixture 34 (e.g. polymerizable hydrogel) is deposited in a front curve mold half by means of a precision dosing nozzle 142, which is part of the dosing or filling station 60. As shown in FIG. 3, in the preferred embodiment, the dosing apparatus 60 comprises eight nozzles, (only four are shown in the side view, the other four are behind the ones shown). The dosing apparatus comprises two in-feed lines 91. The reaction mixture is pumped to each in-feed line 91 via a pump (not shown). The in-feed lines are connected via connectors 93 (partially shown in phantom in FIG. 3), to a manifold 94 in which channels 95 have been drilled (shown in phantom in FIG. 3). Channels 95 in each manifold 94 provide that each in-feed line is split into four equal channels (only two of which are shown, the other two being located behind the ones shown) which are connected via another four connectors 93 (only two of which are shown, the other ones being located behind the ones shown) to four tubes 96 which are the dosing nozzles 142. The tubes are threaded through and attached to a support plate 97, preferably a metal support plate. The manifolds are machined from Delrin, a plastic material, and are attached via bolts 99 to the support plate 97 which is attached via mechanical means, e.g. bolts or screws to a column 98, preferably comprising metal, that moves the deposition apparatus up and down via a servo motor (not shown); however, a pneumatic means, conventional solenoid or stepper motor or the like could be used. In operation the dosing apparatus 60 is lowered right over a pallet carrying front curve mold halves and the pumps are activated to put reaction mixture into the front curve mold halves. The reaction mixture may be dosed under vacuum in each of the front curve mold halves to avoid the possibility of entrapping any gasses between the reaction mixture and the front curve mold half 37; however that is not presently preferred.

Each of the nozzles 142 includes a teflon dosing tip with an O.D. of approximately 0.070" and on I.D. of approximately 0.040 I.D. Each tip is cut at approximately a 45 degree angle, and is positioned to be carried within 0.5 mm of the horizontal tangent of the front curve 37 at the time of dosing.

As the reaction mixture or monomer mixture is dosed, it pools upwardly around the tip, as illustrated in FIG. 1(a), so that the angle of the tip is covered. When the manifold assembly 51 is reciprocated upwardly, the pool of reaction mixture wicks the nozzle tip, and draws any excess reaction mixture from the face of the tip to avoid drop formation on the tip. This wicking action increases the accuracy of the dose, it pulls off potential drops of reaction mixture and it avoids any agitation of the reaction mixture that might result in bubble formation.

If drops of reaction mixture form on the tip, there is the possibility of contamination of a passing pallet or the dosing station from an inadvertent drop. Individual drops of monomer, even when deposited into a mold cavity, or on top of the reaction mixture pool, have been found to generate a "seed" site for a gas bubble. By wicking the tip with the reaction mixture pool, this possibility is substantially eliminated.

In the preferred embodiment of the invention, approximately 60 to 90 microliters of reaction mixture is deposited in the front curve mold half to insure that the mold cavity is overdosed, in order to avoid the possibility of incomplete molding. The excess reaction mixture preferably overflows the mold cavity in the final step of the assembly of the front and back curve mold halves as will be hereinafter described.

The method of operation of the assembly apparatus will be hereinafter described with respect to FIGS. 1(c)–1(e) and FIGS. 4, 5, and 6. Shown in FIGS. 1(c–f) are the steps of picking up the back curve mold halves, holding the front curve mold halves stationary and assembling the front and back curve mold halves to form a mold assembly that are performed by the assembly apparatus which is shown in FIGS. 5 and 6. In these steps nozzle 71 moves down to a position just above the back curve mold halves at which point a vacuum is drawn which lifts the back curve mold halves onto the nozzle as shown in FIG. 1(c). The nozzle carrying the back curve mold half is moved to a position over the front curve mold half or the front curve mold half is moved to a position underneath the back curve mold half, and then the back curve mold half is positioned onto the front curve mold half while using movement preventing means to hold the front curve mold half stationary. The assembly apparatus and method preferably additionally provides for pushing the back curve mold half into front curve mold half. When assembly is complete, the mold assembly preferably is as shown in FIG. 2 with the edge 31c contacting convex surface 33 of the second mold part 36; however, in an alternative embodiment, the mold assembly steps may be complete with no contact between the mold pieces, e.g. as shown in FIG. 1(e), and the contact lens edge may be formed by alternative steps. For example, the contact lens edge may be formed by using an annular shaped mask during a later cure step to prevent the reaction mixture from curing in the area of the mold where the contact lens edge is to be formed.

Figure 4:
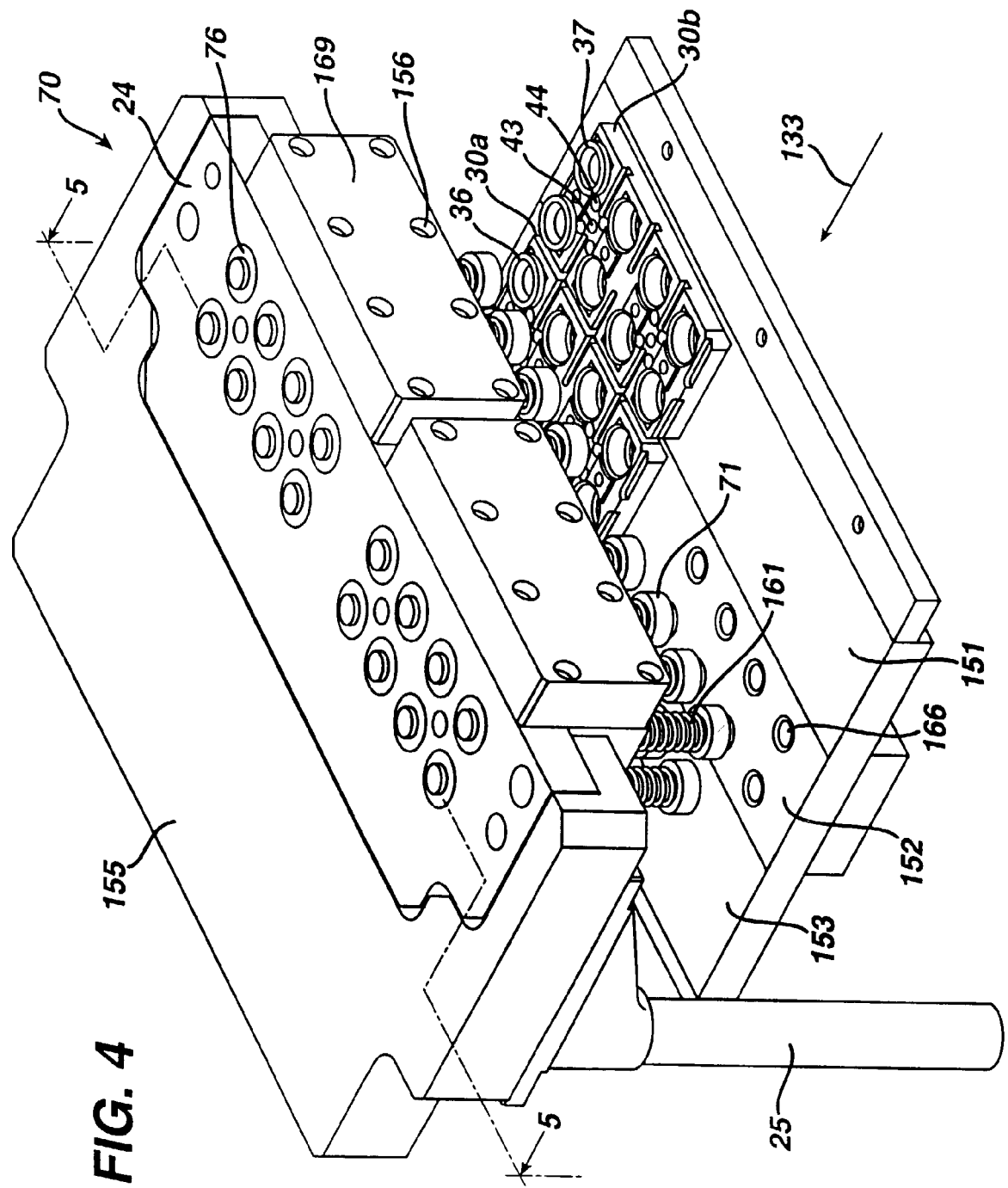
FIG. 4 is a diagrammatic perspective top view of the exterior of the assembly apparatus of one embodiment of the present invention.

FIGS. 4 and 5 show the assembly station or apparatus 70 comprising nozzles 71, preferably sixteen nozzles. The nozzles comprise spring-biased tubes comprising springs 161 and rods or tubes 72. The tubes 72 are biased toward the pallet. The tubes are mounted in openings 73 in the block 24 via bearings 74, 75 and a retaining ring 76 which fits into a groove (not shown) in the tube. The tubes 71 have a chamber 71a which communicates via a hole 78 through the tube 72, through a channel 81 formed by machining grooves into the bearing and the tube, and through a hole 82 in the block 24 with a vacuum source (not shown). The vacuum block 169 is mounted to the block 24 which is mounted to the main support block 155. The main support block is mounted on shafts 25. These pieces are mounted to each other via bolts and screws 156, only some of which are shown.

As shown assembly apparatus 70 further comprises a fixed platform 191 having a surface 165 for the pallets to travel on. Platform 191 has vacuum holes 166 which communicate with a vacuum plenum 167 attached to a vacuum line 168 that communicates with a vacuum source (not shown).

Two pairs of pallets carrying first mold parts and second mold parts are indexed into the assembly apparatus 70 substantially simultaneously by a walking beam or other pusher (not shown) that aligns the back curve pallets 30a with the nozzles 71 suspended above the pallets 30a. FIGS. 4 and 5 show only one pair of pallets 30a, 30b carrying only two mold halves in the right most holes 27 in each of the pallets. In operation, there would be four pallets, carrying a total of sixteen back curve mold halves and sixteen front curve mold halves pushed substantially simultaneously into the assembly apparatus 70. The apparatus provides three lanes for pallets on the surface 165. The first lane 151 is preferably for the front curve pallets 30b, and the second lane 152 is preferably for the back curve pallets 30a, and a third lane 153 is preferably for the return of empty back curve pallets 30a to a mold half loading station (not shown). In the preferred embodiment all three lanes are preferably adjacent to each other, and are very close to the exact width of a pallet. After four pallets enter the assembly station 70, two pallets in each of the first and second lanes 151, 152, two sets of eight vacuum grip nozzles 71 move downwardly via the motion of the shafts 25, to pick up the back curve mold halves from the pallets located under the nozzles 71 in the second lane 152. The shafts 25 are driven up and down by a servo motor (not shown), preferably a ball and screw servo; however a pneumatic cylinder or the like could be used. The back curve mold halves are lifted by means of a vacuum drawn in chamber 71(a) within tube 72, which secures the back curve mold half to the tip 58 of nozzle 71. The vacuum in the nozzles 71 is turned on just prior to picking up the back curves when the nozzle is at its lowermost point above the back curve and remains on until the mold assembly is complete, or just about complete, in accordance with the description below.

After the back curve pick up, the servo motor moves the shafts 25 upwardly which move the nozzles 71 up. Then, a pusher, shown as arrow 133, in FIG. 4, which is preferably an air cylinder with an arm, simultaneously pushes the two pallets 30b carrying the front curves from the first lane 151 to the second lane 152 in which the two empty back curve pallets 30a are located, which pushes the empty back curve pallets 30a into the third lane 153 for the return of empty pallets to a mold part loading station. Once the pusher 133 completes its cycle of movement, the front curve pallets containing the front curve mold halves having reaction mixture therein are located under the nozzles holding the back curve mold halves and over the vacuum holes 166 provided in the second lane 152.

After placement of the pallets 30b (not shown in FIG. 4) under the nozzles 71, the nozzles 71 begin their decent toward the front curves via the servo motor that moves the shafts 25. The nozzles 71 stop just above the surface of the reaction mixture in the front curve mold. At this point, the vacuum in the vacuum holes 166 is drawn. The preferred vacuum pressure is less than 0.8 atmosphere absolute pressure. Vacuum seals with the pallet and the front curves may be provided; however, because all the parts are smooth, enough vacuum is applied to the front curve molds to hold them stationary against the pallet. Once the vacuum is established, the nozzles 71 via the servo motor that moves shafts 25, are slowly lowered to contact and then push the back curves into the reaction monomer until a majority of the contact lens forming surface of the back curve is wetted, preferably substantially wetted, more preferably fully wetted by the reaction monomer. At this point the assembly speed of the nozzle may be increased until the back curve mold halves are preferably fully seated onto the front curve mold halves as shown in the mold assembly in FIG. 1(e) or 2. The vacuum holding the front curve motionless may be turned off after the contact lens forming surface of the back curve mold has been wetted. Additionally, the servo motor preferably overdrives the fully seated position causing the springs 161 on the nozzles 71 to compress which provides for the displacement of the overflow reaction monomer 34a, proper alignment of the mold parts and proper edge formation of the contact lens formed in the mold assembly.

After the mold assemblies have been formed the walking beam or other pusher pushes the pallets 30(b) carrying the mold assemblies 35 out of the assembly apparatus 70 and into the next station for further processing of the reaction mixture 34 within the mold assemblies 35.

The assembly of the mold halves according to the disclosed embodiment of the present invention is also described in the chart illustrated in FIG. 6 in which the position of reciprocating nozzle 71 is plotted as a function of time.

FIG. 6 is a graph of the position of the nozzles 71 versus time in the assembly apparatus 70. As illustrated in FIG. 6, at the start point labeled A, the reciprocating nozzle 71 is located at its highest or home position. At point A, the nozzle is suspended above the back curve, and begins to descend for picking up the back curves, and reaches and secures the back curve in approximately 0.5 seconds, points A to B to C. The nozzle 71 is then reciprocated upwardly to its upper position approximately 20 mm above pallet 30 in approximately 0.25 seconds, to point D. Then, (the empty back curve pallets 30a are pushed out from underneath the nozzles, and) the front curve pallets 30b are positioned under the nozzles 71 during which time the nozzles 71 do not move from points D to E on FIG. 6. With the front curve pallets 30b in place under the nozzles, the nozzles begin their descent to approximately 1 mm above the reactive monomer in the front curve mold half which is point F. Next, the vacuum on the front curves is established as the nozzle 71 takes more than five seconds to move approximately 1 to 1.5 mm to wet a majority of, preferably substantially fully wet, more preferably fully wet the contact lens forming surface of the back curve with the reactive monomer in the front curve. This movement is shown between points F and G. At point G, in the preferred embodiment the vacuum holding the front curves in place is turned off and the nozzle moves faster to point H at which point the nozzle is overdriven to clamp the mold assembly together under pressure. At point H the vacuum in nozzle 71 is turned off. This nozzle position is held for a short time during which the nozzle exerts a downward force on the mold parts (points H to I) to push the excess reactive monomer out of the mold assembly, to form the contact lens edge, and to establish the mold assembly shown in FIG. 2. At point I, the nozzle is lifted, the nozzle stops at point J for an optional puff of air from the nozzle to make sure the back curve does not adhere to the nozzle. Then the nozzle is lifted to its upward position. The front curve pallet leaves the assembly apparatus, and new pallets are advanced preferably by the actions of a walking beam, and the process is repeated. The travel rate of the back curve into the reactive monomer when the back curve gets wetted by the reactive monomer (between points F and G), is approximately, preferably is less than, more preferably is slightly less than the wetting speed of the reactive monomer on the mold parts to avoid the reactive monomer being pushed by the mold parts.

The preferred embodiment is shown in FIG. 6; however, to decrease the formation of defects in the contact lens, the time it takes for the nozzle to travel from points F to G, as defined above in relationship to FIG. 6, should be greater than 3.0 seconds, more preferably from 3.5 to 10 seconds, most preferably from 4 to 6 seconds. During mold assembly, the preferred travel rate of the back curve into the reactive monomer in the front curve, that is the travel rate from points F to G, is less than 0.35 mm/sec, more preferably from 0.1 mm/sec to 0.3 mm/sec, most preferably from 0.2 to 0.3 mm/sec.

In alternative embodiments of this invention, the vacuum pick up of the back curves and the vacuum hold down of the front curves can be accomplished by alternative mechanical means such as, with mechanical fingers for the hold down or pick up. Further hold down could be accomplished using weights over the mold parts, or a plate that could be placed over the pallet with large enough holes to allow for mold assembly, but small enough holes to anchor the flange of the front curves. Alternatively, the front curves and pallets could be designed so that the front curves snap into the opening in the pallets, and are held by tensile forces. Alternatively the mold parts could be shaped differently, e.g. the front curve could have a larger flange so that a mechanical attachment, such as a spring-biased annular ring that could protrude below the tip of the nozzle (outside of the area where the assembly would occur) could hold the front curve stationary while the back curve was seated in the reaction monomer. An embodiment wherein the front curve may be significantly larger than the back curve, are those in the prior art that disclose using the front curve, for molding the contact lens and then as the package for the contact lens. Another option is to use magnetism for the stabilization of a front curve mold having a metal component incorporated into it. Other movement preventing means should be apparent to a persons of ordinary skill in the art in light of the teachings herein.

FIGS. 7(d–f) show an embodiment of the invention in which the front curves may be held stationary by movement preventing means comprising movable fingers 84 that can be pressed onto the flange of the front curves to hold them stationary during assembly. In the preferred embodiment more than one finger in more than one location on the flange of each front curves would be used to prevent the movement of the front curve during the assembly of the mold parts. These fingers 84 can be similar to the bottom set of fingers used during the demold process described in U.S. Pat. No. 5,850,107, incorporated herein by reference. The fingers could be U-shaped, 0.3 to 1.5 mm thick, and mounted on a support that can move one or more of them in a lateral direction from a position adjacent to where pallets are conveyed to a position in which the fingers are located on the flange of a front curve mold on a pallet, as shown in FIG. 7(d). The rest of the assembly method and apparatus can be as described earlier herein.

Alternatively, the back curve could be held stationary and the front curve controllably moved into contact with the back curve. The back curve could be held stationary by a vacuum in a nozzle similar to nozzle 71 described above, except the nozzle would not move. Alternatively, the back curve could be held stationary by any of the movement preventing means described above for the front curves, and the front curves either individually or in groups of 2 or more (optionally mounted on a pallet) could be controllably moved, e.g. by one or more pistons, into contact with the stationary back curve(s). Alternatively, both the back curves and the front curves, individually or in groups, could be controllably moved into contact with each other by any combination of movement means described above, e.g. moveable nozzles, and pistons. In these alternative embodiments, it is preferred that the relative movement of the curves is such that it takes greater than 3.0 seconds, more preferably from 3.5 to 10 seconds, most preferably from 4 to 6 seconds for the first and/or second mold parts (either front curves and/or back curves) to move from the point just prior to contact of the reaction monomer by both mold parts to the point at which the a majority of the contact lens forming surfaces of the first and second mold parts are wetted, preferably substantially, most preferably fully wetted by the reaction monomer. During mold assembly, the preferred relative travel rate of the first and second mold parts towards each other either by the movement of one or both mold parts from the point just prior to contact of the reaction monomer by both mold parts to the point at which a majority of the contact lens forming surfaces of the first and second mold parts become wetted, preferably substantially wetted, most preferably fully wetted by the reaction monomer is less than 0.35 mm/sec, more preferably from 0.1 mm/sec to 0.3 mm/sec, most preferably from 0.2 to 0.3 mm/sec. The reaction monomer is introduced or placed on either mold part or injected between the mold parts prior to their full assembly.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. An apparatus for assembling first and second mold parts having contact lens forming surfaces, wherein said first mold part comprises a front curve mold part and has a reaction mixture on said contact lens forming surface, and the second mold part comprises a back curve cold part, said apparatus comprising:
    a vacuum nozzle comprising a compression spring fixedly attached to a shaft; wherein said nozzle is suitably sized and operative to pick up the second mold part when vacuum pressure is applied to the nozzle;
    a pallet comprising a receptacle for holding the first mold part, the pallet additionally comprising a vacuum hole in the receptacle;
    a pushing apparatus for positioning the pallet and first mold part in vertical alignment with the shaft;
    a source of atmospheric pressure differential operative to apply a vacuum pressure of less than 0.8 atmospheric absolute pressure to the vacuum hole which prevents said first mold part from moving while said second mold part is controllably moved from a first position wherein said second mold part is not in contact with said reaction mixture on said first mold part to a second position wherein the majority of said contact lens forming surface of said second mold part has been wetted by said reaction mixture on said first mold part and removes the vacuum pressure after the contact lens forming surface of said second mold part has been wetted; and
    a servo motor for moving the shaft and the nozzle in a downward direction causing the second mold part to move into the second position and additionally overdrive the second position causing the springs to compress which provides for displacement of overflow reaction mixture, proper alignment of the first mold part and the second mold part and edge formation of a contact lens formed between the first mold part and the second mold part.

2. The apparatus of claim 1 wherein said vacuum nozzle is additionally operative to blow off the second mold part when positive pressure is applied to the nozzle.

3. The apparatus of claim 1 wherein said apparatus moves said second mold part from said first position to said second position at a speed of less than 0.35 mm/sec.

4. The apparatus of claim 1 wherein first second mold part is moved from said first position to said second position at a speed of from 0.1 to 0.3 mm/sec.

5. The apparatus of claim 1 wherein said shaft and said nozzle move at a speed of less than 1 mm/sec from said first position to said second position.

6. The apparatus of claim 1 wherein said nozzle travels at a speed less than 0.35 mm/sec.

7. A method for assembling first mold part comprising a front curve mold part and a second mold part comprising a back curve mold part, each mold part having contact lens forming surfaces, said method comprising the steps of:
    introducing a reaction mixture on said contact lens forming surface of said first mold part;
    applying a vacuum force to a vacuum nozzle fixedly attached to a shaft and comprising a compression spring;
    lifting said second mold part with the vacuum nozzle;
    placing said first mold part in a receptacle formed in a pallet, said receptacle comprising a hole for applying a vacuum pressure to said first mold part;
    pushing the pallet into a position that places the first mold part in vertical alignment with the vacuum nozzle;
    applying a vacuum pressure of less than 0.8 atmospheric absolute pressure to the hole in the receptacle to thereby preventing said first mold part from moving while controllably moving said shaft in a downward direction to cause said second mold part to travel from a first position wherein said reaction mixture contacts one of said mold parts to a second position wherein the majority of said contact lens forming surfaces of said first and second mold parts have been wetted by said reaction mixture on said first mold part;
    continue moving said shaft in a downward direction to overdrive the second position and cause the springs to compress;
    displacing an overflow of reaction mixture and
    removing said vacuum pressure from the hole in the receptacle.

8. The method of claim 7 wherein said step of preventing said first mold part from moving is additionally accomplished by holding said first mold part by using mechanical means.

9. The method of claim 8 wherein said step of preventing step said first mold part from moving is additionally accomplished by moving mechanical means onto said first mold part.

10. The method of claim 7 wherein said step of preventing step said first mold part from moving is additionally accomplished by applying weight to said first mold part.

11. The method of claim 7 wherein said controllably moving step is performed at a speed of less than 0.35 mm/sec.

* * * * *